(No Model.)

J. HILL.
STREET CAR MOTOR.

No. 262,044. Patented Aug. 1, 1882.

WITNESSES
J. C. Clark
Wm. J. Clagett

INVENTOR
Joseph Hill
by Geo. W. Dyer
Attorney

N. PETERS, Photo-Lithographer, Washington, D. C.

UNITED STATES PATENT OFFICE.

JOSEPH HILL, OF WILLIAMSPORT, PENNSYLVANIA.

STREET-CAR MOTOR.

SPECIFICATION forming part of Letters Patent No. 262,044, dated August 1, 1882.

Application filed May 10, 1882. (No model.)

*To all whom it may concern:*

Be it known that I, JOSEPH HILL, of Williamsport, in the county of Lycoming and State of Pennsylvania, have invented a new and useful Improvement in Street-Car Motors; and I do hereby declare that the following is a full and exact description of the same, reference being had to the accompanying drawings, and to the letters of reference marked thereon.

My invention, which is hereinafter described and illustrated, relates to improvements in steam-motors for street-railroad cars; and it consists mainly in the novel combination of the operative parts, all as more fully hereinafter described.

For the better comprehension of my invention, reference will be made throughout the following description to the accompanying drawings, in which—

Figure 1:
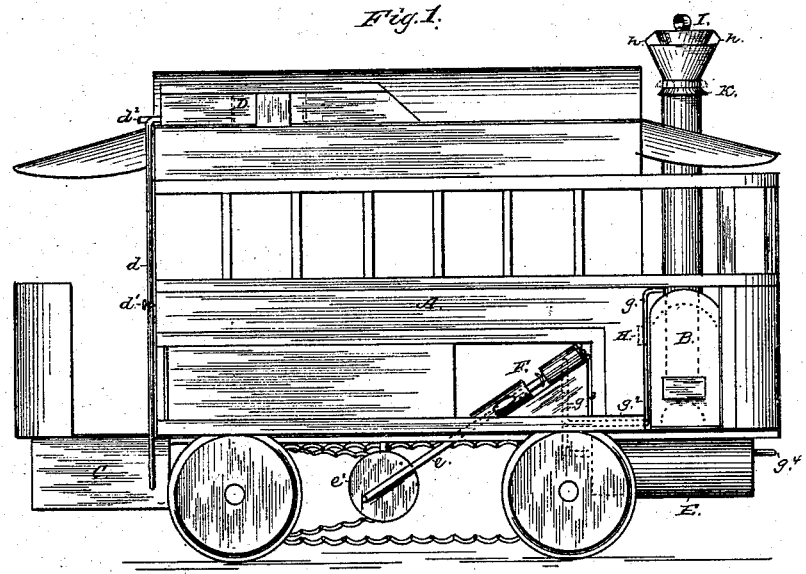
Figure 2:
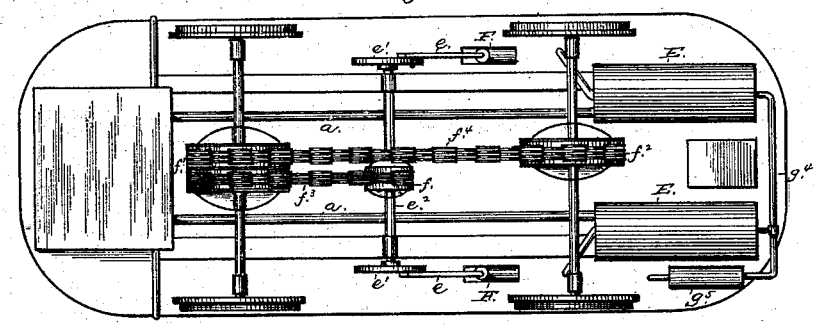

Figure 1 is an elevation of my street-car; Fig. 2, a view from beneath of the bottom of the same.

Like letters refer to corresponding parts throughout the several views.

In the drawings, the car proper, which is of usual construction, is represented by the letter A. It has mounted on its front platform a jacketed boiler, B, and under its rear platform a water-tank, which is marked C, and which is connected by means of pipes, hereinafter mentioned, with the supplementary water-tanks D D, mounted upon the roof of the car. Of the tanks D D, above referred to, only one is shown in the drawings, Fig. 1. As shown in that figure, connection is made between them and the tank C by means of the pipes $a\,a$, (only one shown,) which are located near the rear end of the car. These pipes are provided, as shown, with suitable check-valves, $a'$. To facilitate the filling of the tanks D D they are connected by means of the pipe $a^2$, which extends across the top of the car from one to the other. By means of this connection between the two the water, which is poured into one, passes through the pipe $a^2$ and fills both. The closed tank C is connected by means of suitable pipes, $a\,a$, with the condensers E E, which are situated near the opposite or front end of the car. The principal purpose of mounting these supplementary tanks D D on the top of the car is to give a water-pressure in tank C.

Under the seats of the car are located suitable engines, F F, which communicate motive power through suitable sprocket-gears, now to be described. The pistons $e\,e$ of these engines act as pitmen, and are connected at one end to ordinary wrist-wheels, $e'$. These wheels $e'$ are secured to and revolve with a shaft, $e^2$, which is suspended from the car by suitable hangers. At or about the center of this shaft $e^2$ is located a sprocket-wheel, $f$. To the rear axle of the car a double sprocket-wheel, $f'$, is secured, and to the front axle a single wheel, $f^2$, similar to the one, $f$, above referred to. Around the wheel $f$ and one portion of the wheel $f'$ a sprocket-chain, $f^3$, is passed, and around the remaining portion of this wheel $f'$ and the wheel $f^2$ a second chain, $f^4$, is passed. By this construction, upon the revolution of the wheel $f$, the rear wheels of the car, through the medium of the chain $f^3$, are caused to revolve, and the front wheels at the same time are revolved by the chain $f^4$.

From the dome of the boiler B, which is of ordinary construction, live steam is carried down through a vertical pipe, $g$, into a cross-pipe, $g'$. From this cross-pipe $g'$ the steam enters bent pipes $g^2$, Fig. 1, through which it is carried into the cylinders of the engines F F. The exhaust-steam left in these cylinders is carried off through suitable pipes, $g^3$, and through them enters the condensers E E, before mentioned, and in which the feed-water pipes are contained. After passing through these condensers the exhaust-steam enters a pipe, $g^4$, suitably located and connected with said condensers, thence through a "deadener," $g^5$, to which said pipe is connected, into the flues of the boiler, after which it escapes through the smoke-stack G.

The deadener $g^5$, above referred to, consists of a section of large rubber or other flexible hose, and by its use the sound of escaping steam is destroyed as said deadener "takes up" the sound. The construction of this deadener is not herein claimed, as it is intended to be made the subject of a separate application for a patent.

Having thus described my invention, what I claim as new therein, and that for which I desire to secure Letters Patent, is—

1. In combination with the boiler of a street-car motor, the water-tank C, water-supply pipes $a$ $a$, condensers E E, and deadener $g^5$, substantially as and for the purposes set forth.

2. In combination with the boiler of a street-car motor, the water-tank C and supplementary tanks D D, substantially as and for the purposes described.

This specification signed and witnessed this 12th day of April, 1882.

JOSEPH HILL.

Witnesses:
M. J. CLAGETT,
GEO. H. COOPER, Jr.